United States Patent
Okuwaki et al.

(10) Patent No.: US 7,643,191 B2
(45) Date of Patent: Jan. 5, 2010

(54) OPTICAL SCANNER AND IMAGE FORMING APPARATUS

(75) Inventors: Hiroyuki Okuwaki, Kanagawa (JP); Yasuhiro Naoe, Kanagawa (JP); Ryouji Hirai, Kanagawa (JP); Shinichi Ozaki, Kanagawa (JP); Jun Ando, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/873,069

(22) Filed: Oct. 16, 2007

(65) Prior Publication Data
US 2008/0130078 A1 Jun. 5, 2008

(30) Foreign Application Priority Data
Oct. 18, 2006 (JP) ............... 2006-284314

(51) Int. Cl.
G02B 26/08 (2006.01)
(52) U.S. Cl. ............... 359/204.1; 359/212.1
(58) Field of Classification Search .......... 359/198–218
See application file for complete search history.

(56) References Cited

U.S. PATENT DOCUMENTS

| | | | |
|---|---|---|---|
| 5,475,416 A | 12/1995 | Kessler et al. | |
| 5,758,950 A | 6/1998 | Naoe et al. | |
| 6,097,749 A | 8/2000 | Naoe et al. | |
| 6,151,151 A | 11/2000 | Ozaki | |
| 6,175,439 B1 | 1/2001 | Ozaki et al. | |
| 6,268,876 B1 | 7/2001 | Ozaki et al. | |
| 6,472,247 B1 | 10/2002 | Andoh et al. | |
| 6,574,054 B2 | 6/2003 | Hirai et al. | |
| 6,687,283 B2 | 2/2004 | Naoe | |
| 6,795,257 B2 | 9/2004 | Andoh et al. | |
| 6,798,820 B2 | 9/2004 | Okuwaki et al. | |
| 2005/0128550 A1 | 6/2005 | Andoh et al. | |
| 2006/0187294 A1 | 8/2006 | Saisho et al. | |
| 2006/0187513 A1* | 8/2006 | Ohsugi ................. | 359/212 |
| 2006/0232844 A1* | 10/2006 | Nakajima ............. | 359/204 |
| 2006/0284968 A1 | 12/2006 | Hayashi et al. | |

FOREIGN PATENT DOCUMENTS

| | | |
|---|---|---|
| CN | 1825162 A | 8/2006 |
| JP | 7-72407 | 3/1995 |
| JP | 9-243962 | 9/1997 |
| JP | 9-246658 | 9/1997 |
| JP | 2000-98278 | 4/2000 |

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

An optical scanner that performs scanning by deflecting plural light beams using a single deflector. The optical scanner includes plural pre-scanning optical systems configured to emit the plural light beams and each including a light source. A first of the pre-scanning optical systems emits a first of the light beams to be deflected by the deflecting unit. A second of the pre-scanning optical systems emits a second of the light beams and is disposed in the position different from a position of the first pre-scanning optical system in a rotational axis direction of the deflector.

13 Claims, 11 Drawing Sheets

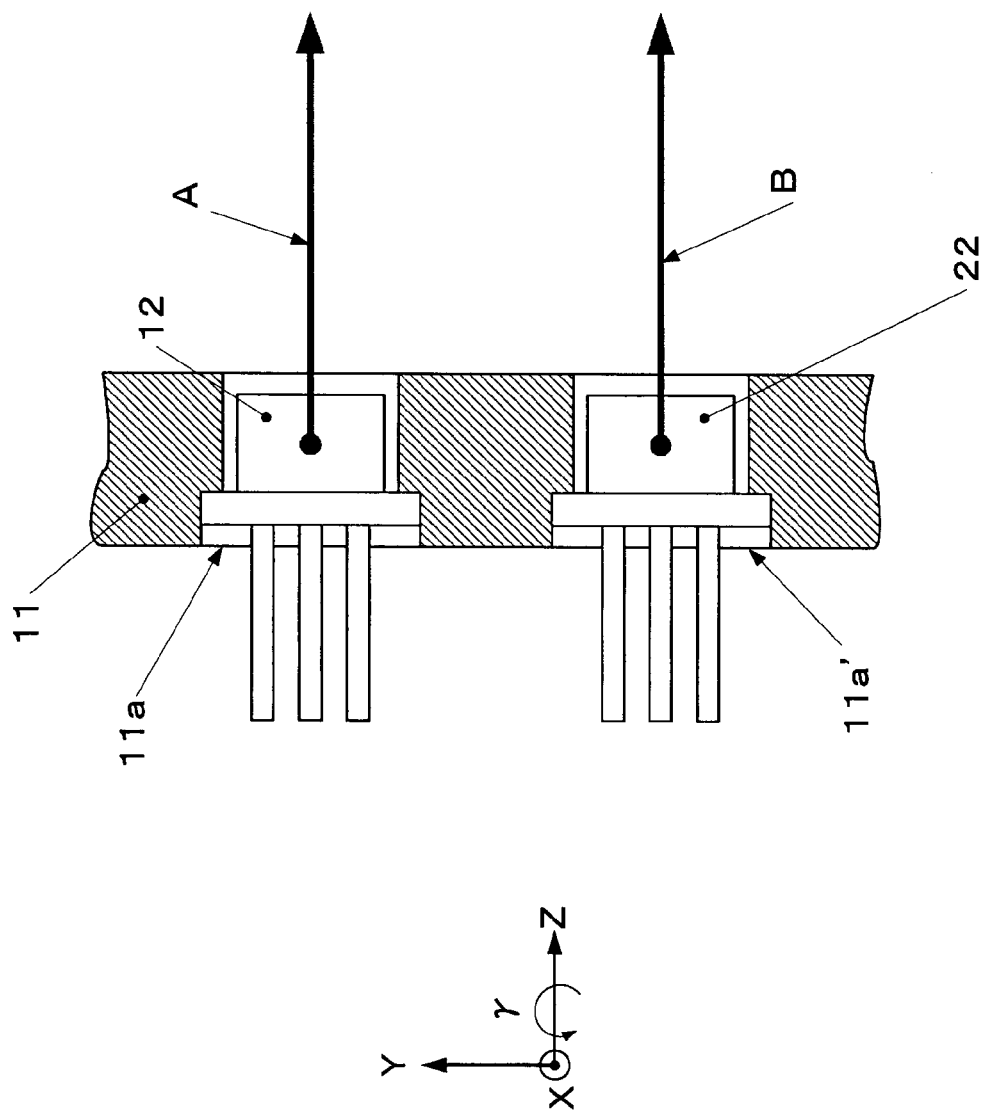

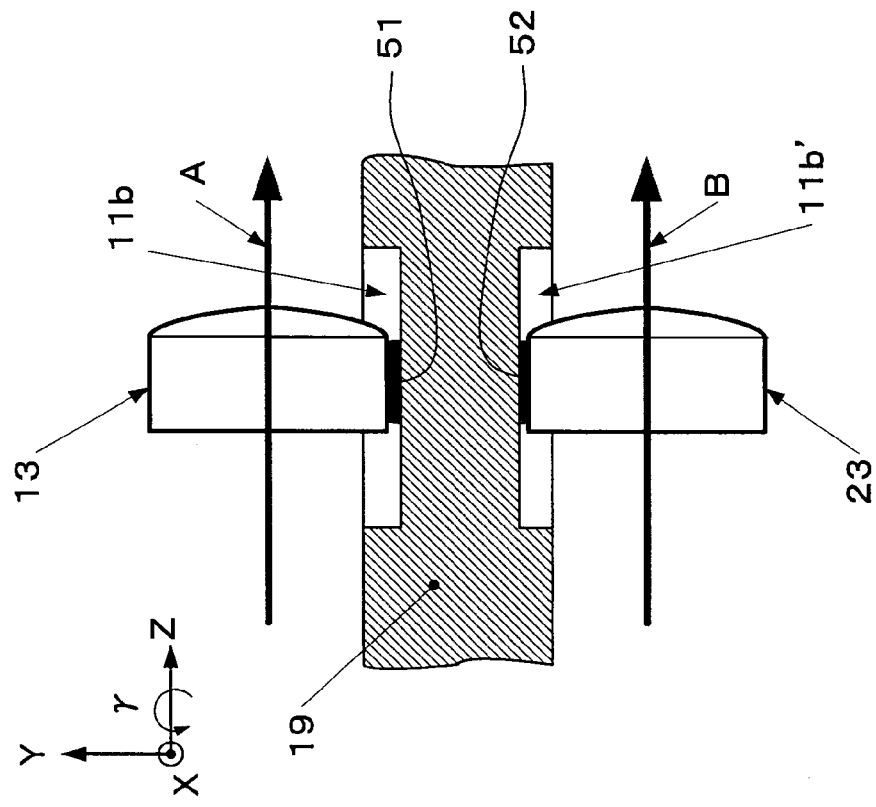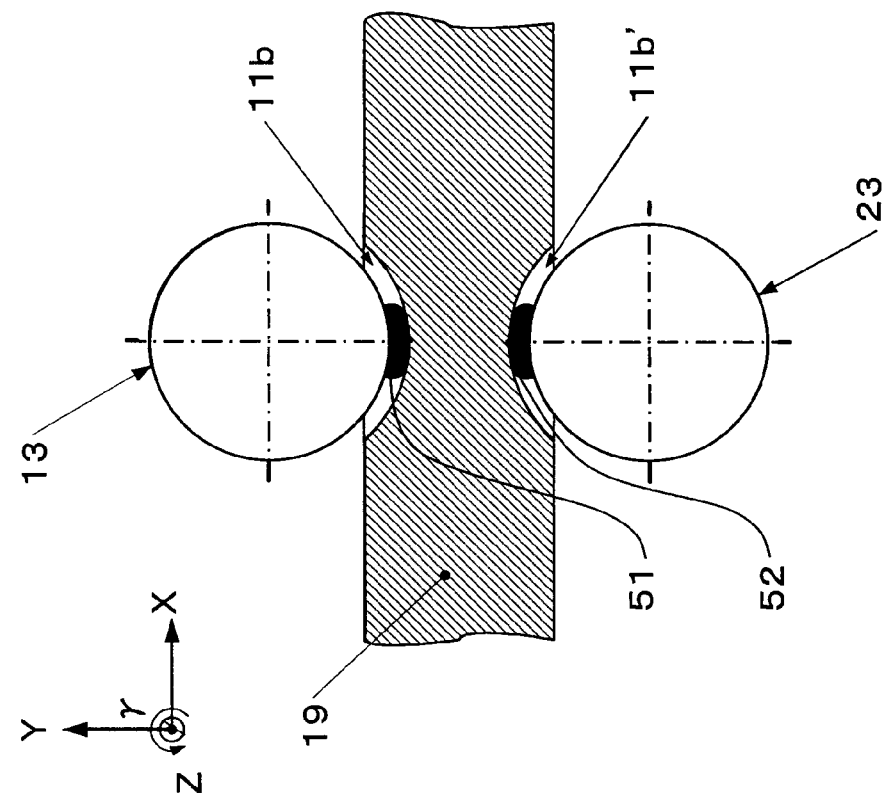

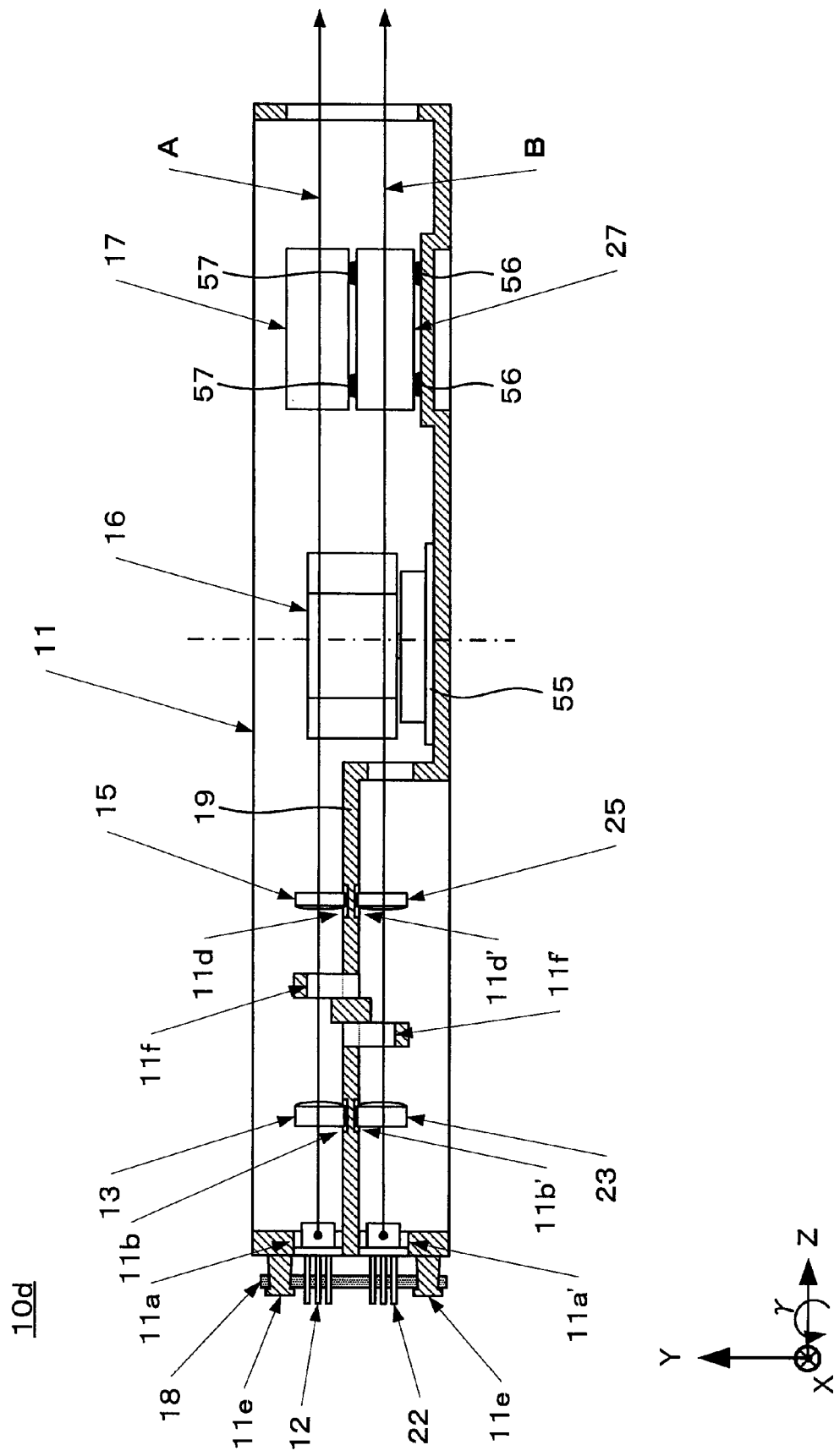

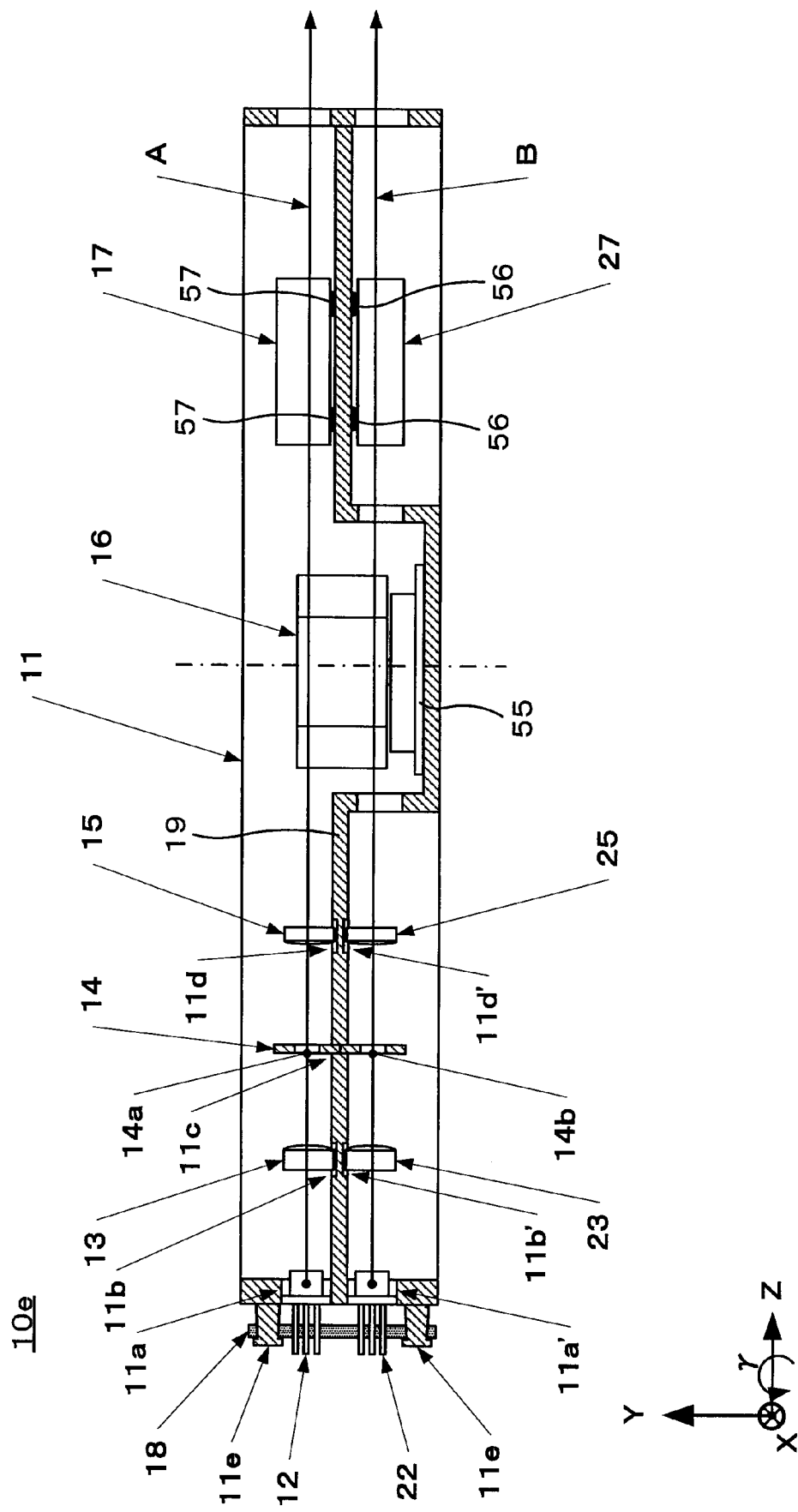

OPTICAL SCANNER AND IMAGE FORMING APPARATUS

CROSS-REFERENCE TO RELATED APPLICATIONS

The present patent application claims priority under 35 U.S.C. §119 from Japanese Patent Application No. 2006-284314, filed on Oct. 18, 2006 in the Japan Patent Office, the contents and disclosures of which are hereby incorporated by reference herein in their entirety.

BACKGROUND OF THE INVENTION

1. Field of the Invention

The present invention relates to an optical scanner and an image forming apparatus.

2. Description of the Related Art

In recent years, there has been an increasing demand for higher speed optical scanners for use in optical printers such as laser beam printers, digital copiers, and plain paper facsimile machines. Conventionally, to improve the speed of an optical scanner using a single beam, the operating speed of a deflector is increased. This requires measures such as reducing noise due to high speed operation and increasing the output of the light source, resulting in a substantial increase in the production costs of the deflector.

Scanning multiple beams onto the scanning surface at certain pitch intervals in a sub-scanning direction has achieved high-speed scanning without increasing the rotational speed of the deflector. The multibeam scanning uses a circuit that modulates the plural light sources independently from each other. However, if a circuit board for light source modulation is provided for each of the light sources, an increased number of connectors and interconnect lines are used for connecting these circuit boards to a control circuit for generating write signals. Moreover, expensive cables for noise reduction such as shielded lines are used in addition to the circuit boards for the individual light sources. Adding these components significantly increases the production costs.

Japanese Patent Laid-Open Publication No. 2000-98278 discloses an inexpensive simple optical scanner capable of producing a beam spot on the scanning surface. In this optical scanner, plural light sources are mounted on a single circuit board such that light beams emitted from the respective light sources form an angle.

Optical scanners using semiconductor lasers need to achieve, as their optical properties, accuracy requirements of a laser beam position on the scanning surface, a main scanning direction of a laser beam, and a beam diameter in a sub-scanning direction. These accuracy requirements are becoming more stringent year by year.

The environment in which the optical scanners are actually used is inside a digital copier or a laser printer and, in many cases, is different from the environment in which adjustments of the optical properties of the optical scanners are performed. Therefore, tolerance of environmental changes, i.e., being less affected by environmental changes, is a feature required for the optical scanners.

Providing such an optical scanner having high accuracy and tolerance of the environmental changes leads to increased component costs due to improvements in the accuracy of the components of the optical scanner and increased time for assembly and adjustment due to more rigorous requirements in the adjustment accuracy. It is therefore difficult to satisfy such requirements in terms of both the scanning accuracy and the production cost.

SUMMARY OF THE INVENTION

In view of the foregoing, the present invention aims to provide an optical scanner having high accuracy and a simple structure, and an image forming apparatus using the optical scanner.

In one embodiment of the present invention, there is provided an optical scanner that performs scanning by deflecting plural light beams using a single deflector. The optical scanner includes plural pre-scanning optical systems configured to emit the plural light beams and each including a light source. A first of the pre-scanning optical systems emits a first of the light beams to be deflected by the deflecting unit. A second of the pre-scanning optical systems emits a second of the light beams and is disposed in a position different from a position of the first pre-scanning optical system in a rotational axis direction of the deflector.

In another embodiment of the present invention, there is provided an image forming apparatus including the above-described optical scanner.

According to an aspect of the present invention, it is possible to provide an optical scanner having high accuracy and a simple structure, and an image forming apparatus using the optical scanner.

BRIEF DESCRIPTION OF THE DRAWINGS

FIG. 3 is a cross-sectional schematic diagram showing light source attachment portions of the optical scanner according to the first embodiment;

FIGS. 4A and 4B are cross-sectional schematic diagrams each showing collimator lens attachment portions of the optical scanner according to the first embodiment;

FIG. 9 is a cross-sectional schematic diagram showing an optical scanner according to a second embodiment;

FIG. 11 is a cross-sectional schematic diagram showing an optical scanner according to a third embodiment.

DETAILED DESCRIPTION OF THE PREFERRED EMBODIMENT

Preferred embodiments of the present invention are described below with reference to the accompanying drawings.

In an embodiment of the present invention, an optical scanner for a color laser printer or the like is illustrated that deflects and scans laser beams onto four photoreceptors of four colors, e.g., cyan, magenta, yellow, and black. The optical scanner can emit laser beams of four light paths to the corresponding photoreceptors.

Figure 1:
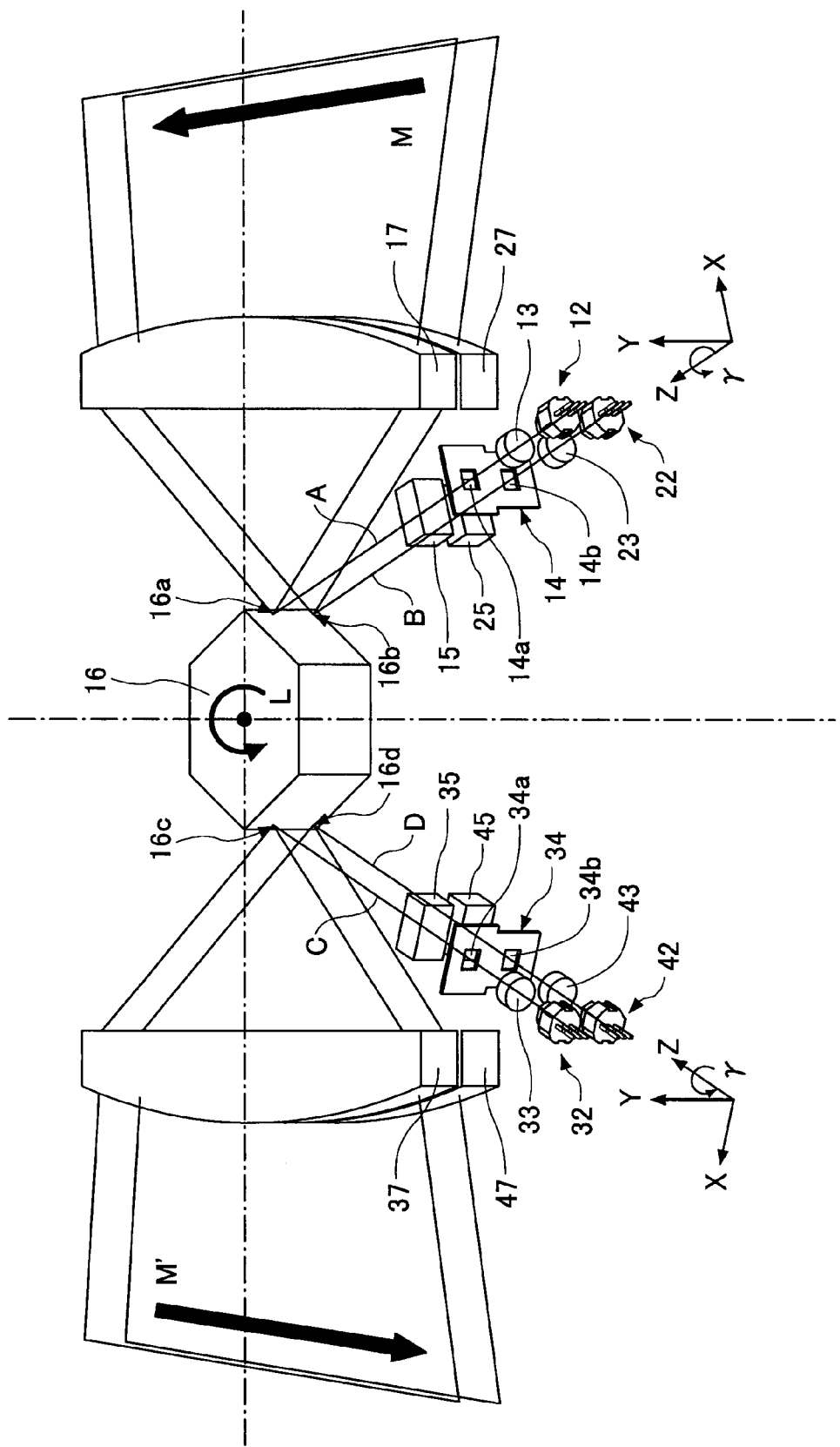
FIG. 1 is an exploded perspective view showing an optical scanner according to an embodiment of the present invention.

FIG. 1 is an exploded perspective view showing an optical scanner 10 according to an embodiment of the present invention.

With reference to FIG. 1, the optical scanner 10 generally includes light sources 12, 22, 32, 42; collimator lenses 13, 23, 33, 43; apertures 14a, 14b, 34a, 34b; a deflector 16 having deflector reflecting surfaces 16a, 16b, 16c, 16d; and scanning lenses 17, 27, 37, 47. An optical housing as a casing of the optical scanner 10 is not shown in FIG. 1. In FIG. 1, the X-axis indicates a main-scanning direction; the Y-axis indicates a sub-scanning direction; the Z-axis indicates an optical axis traveling direction; and the γ-axis indicates an optical axis circumferential direction.

A basic configuration and features of the optical scanner 10 are described below referring to the four light paths of laser beams A, B, C, D at the same time. Some optical devices bear plural reference numerals in order to show optical device elements corresponding to the individual laser beam paths. The corresponding relationships between the optical devices and the laser beam paths are shown in Table 1.

embodiment, the apertures 14a, 14b and the apertures 34a, 34b have unitary structures forming an aperture 14 and an aperture 34, respectively.

The cylindrical lenses 15, 25, 35, 45 have refractive power only in the sub-scanning direction and are configured to focus the light beams emitted from the collimator lenses 13, 23, 33, 43 to form line images extending in the main scanning direction in the vicinity of the deflector.

The deflector 16 is shared by pre-scanning optical systems of the four light paths. The deflector 16 is a polygon mirror and configured to rotate at a predetermined speed in the direction of the arrow L of FIG. 1 so that the deflector reflecting surfaces 16a, 16b, 16c, 16d reflect and deflect the laser beams A, B, C, D that have been incident thereon through the cylindrical lenses 15, 25, 35, 45, thereby scanning the laser beams A, B, C, D within a scan angle range in the main-scanning direction at a substantially constant angular velocity.

The scanning lenses 17, 27, 37, 47 as groups of imaging lenses focus the laser beams A, B, C, D deflected by the deflector 16 onto scanning surfaces (not shown) at a constant velocity using scanning mirrors (not shown). The pre-scan-

TABLE 1

| | LOCATION IN FIG. 1 | LIGHT SOURCE | COLLIMATOR LENS | APERTURE | CYLINDRICAL LENS | DEFLECTOR | SCANNING LENS |
|---|---|---|---|---|---|---|---|
| LASER BEAM A | UPPER RIGHT | 12 | 13 | 14a | 15 | 16 | 17 |
| LASER BEAM B | LOWER RIGHT | 22 | 23 | 14b | 25 | 16 | 27 |
| LASER BEAM C | UPPER LEFT | 32 | 33 | 34a | 35 | 16 | 37 |
| LASER BEAM D | LOWER LEFT | 42 | 43 | 34b | 45 | 16 | 47 |

Divergent light beams emitted from the light sources 12, 22, 32, 42 are converted into substantially parallel light beams by the collimator lenses 13, 23, 33, 43, and then shaped by the apertures 14a, 14b, 34a, 34b to become the laser beams A, B, C, D, respectively. The laser beams A, B, C, D are focused onto the deflector reflecting surfaces 16a, 16b, 16c, 16d as lines extending in the main-scanning direction.

The light sources 12, 22, 32, 42 include semiconductor lasers, for example, and are configured to be modulated by predetermined write signals and emit divergent light beams. As mentioned above, theses divergent light beams pass through the collimator lenses 13, 23, 33, 43 and the apertures 14a, 14b, 34a, 34b to become the laser beams A, B, C, D.

The light sources 12, 22, 32, 42 may be multibeam light sources each including plural semiconductor lasers. In this case, divergent light beams emitted from the semiconductor lasers are parallel to each other. The semiconductor lasers of each multibeam light source are independently modulated by the corresponding write signals, thereby performing very high speed scanning on the scanning surface.

The collimator lenses 13, 23, 33, 43 are configured to couple the divergent light beams emitted from the light sources 12, 22, 32, 42 to convert them into substantially parallel laser beams.

The aperture 14a, 14b, 34a, 34b are configured to remove scattered lights, which are generated due to such as axial shifts of the light sources 12, 22, 32, 42 and the collimator lenses 13, 23, 33, 43, from the substantially parallel light beams emitted from the collimator lenses 13, 23, 33, 43 so as to emit the laser beams A, B, C, D. In a below-described first ning optical systems and the imaging lens groups have conjugated relationships with respect to reflecting points of the deflector reflecting surfaces 16a, 16b, 16c, 16d.

The foregoing describes the light paths of the laser beams A, B, C, D at the same time. The following describes the light paths of the laser beams A, B, C, D one by one.

The light source 12 for emitting the laser beam A, the collimator lens 13, the aperture 14a, and the cylindrical lens 15 are substantially linearly positioned and arranged such that the laser beam A can obtain predetermined optical properties on the scanning surface, and are configured to form a pre-scanning optical system. The laser beam A is guided to the scanning lens 17 by the single deflector 16.

The light source 22 for emitting the laser beam B, the collimator lens 23, the aperture 14b, and the cylindrical lens 25 are substantially linearly positioned and arranged such that the laser beam B can obtain predetermined optical properties on the scanning surface, and are configured to form a pre-scanning optical system. The laser beam B is guided to the scanning lens 27 by the single deflector 16.

The light source 32 for emitting the laser beam C, the collimator lens 33, the aperture 34a, and the cylindrical lens 35 are substantially linearly positioned and arranged such that the laser beam C can obtain predetermined optical properties on the scanning surface, and are configured to form a pre-scanning optical system. The laser beam C is guided to the scanning lens 37 by the single deflector 16.

The light source 42 for emitting the laser beam D, the collimator lens 43, the aperture 34b, and the cylindrical lens 45 are substantially linearly positioned and arranged such that the laser beam D can obtain predetermined optical properties on the scanning surface, and are configured to form a pre-scanning optical system. The laser beam D is guided to the scanning lens 47 by the single deflector 16.

The relative positional relationships between the four light paths of the laser beam A, the laser beam B, the laser beam C, and the laser beam D are described below.

The light paths of the laser beam A and the laser beam B are aligned as a pair in the direction (the sub-scanning direction) perpendicular to the main scanning plane. The sub-scanning direction in this case indicates the rotational axis direction of the deflector 16. Similarly, the light paths of the laser beam C and the laser beam D are aligned as a pair in the sub-scanning direction, i.e., in the rotational axis direction of the deflector 16.

The light paths of the laser beam A and the laser beam C are in the same plane parallel to the main scanning plane. The light paths of the laser beam B and the laser beam D are in the same plane parallel to the main scanning plane. The scanning direction of the laser beam A and the laser beam B indicated by the arrow M of FIG. 1 is 180 degrees opposite to the scanning direction of the laser beam C and the laser beam D indicated by the arrow M' of FIG. 1. The pair of the laser beam A and the laser beam B and the pair of the laser beam C and the laser beam D are symmetric with respect to the plane at a right angle to the deflecting scanning central axis of the single deflector 16 and at a right angle to the main scanning plane.

First Embodiment

The following describes an optical scanner 10a according to a first embodiment of the present invention.

Figure 2:
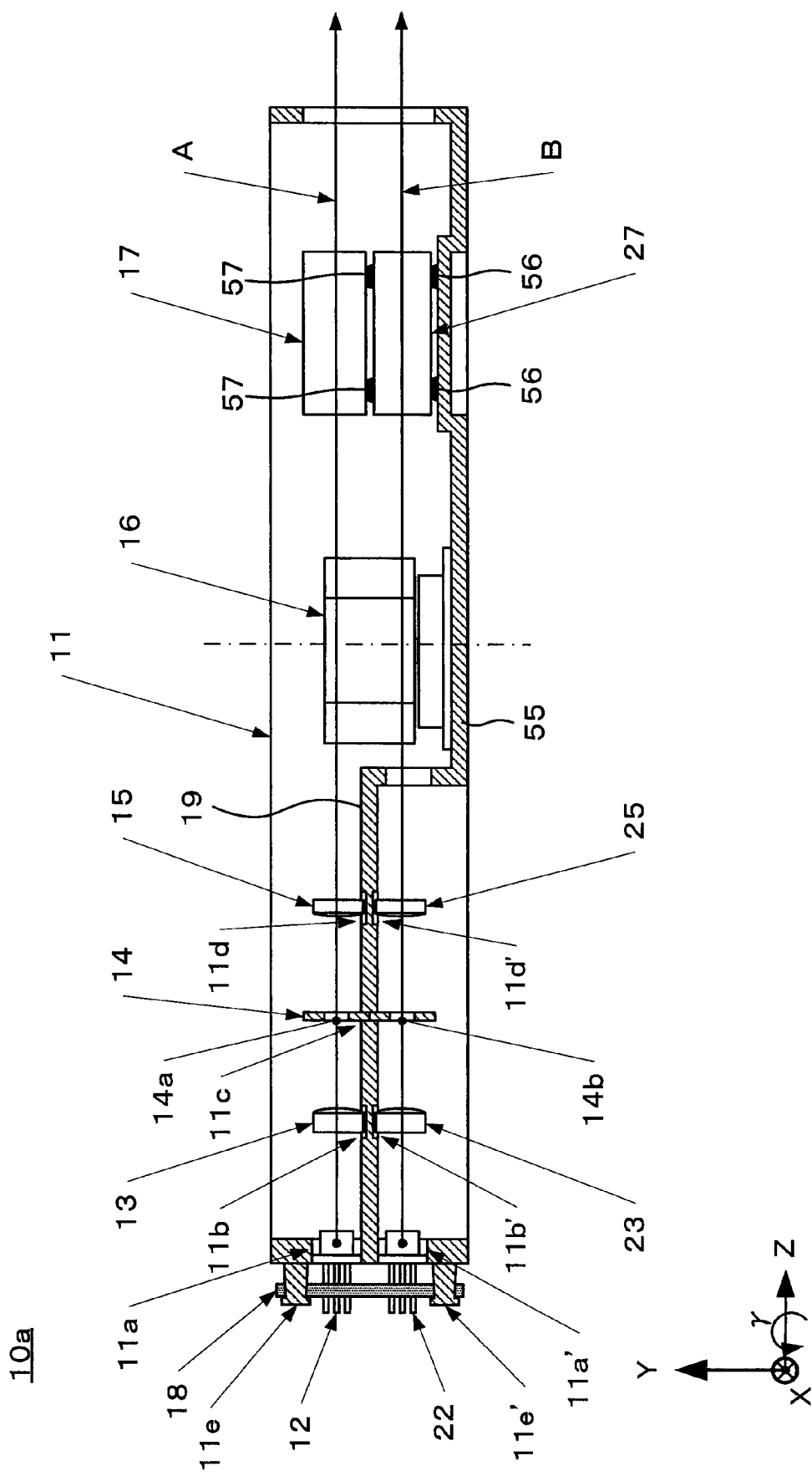
FIG. 2 is a cross-sectional schematic diagram showing an optical scanner according to a first embodiment.

FIG. 2 is a cross-sectional schematic diagram showing the optical scanner 10a according to the first embodiment. In FIG. 2, elements corresponding to those described above bear the same reference numerals and are not further described.

Referring to FIG. 2, the cross-sectional schematic diagram of the optical scanner 10a shows light paths of a pair of pre-scanning optical systems of a laser beam A and a laser beam B. A pair of pre-scanning optical systems of a laser beam C and a laser beam D has the same configuration as the pair of the pre-scanning optical systems of the laser beam A and the laser beam B and therefore is not described herein. The cross-sectional schematic diagram of the optical scanner 10a of FIG. 2 continuously shows two cross sections in different directions at the opposing sides of a dotted-line of FIG. 2 passing through the reflecting surface of the deflector 16 described with reference to FIG. 1. In FIG. 2, the X-axis indicates a main-scanning direction; the Y-axis indicates a sub-scanning direction; the Z-axis indicates an optical axis traveling direction; and the γ-axis indicates an optical axis circumferential direction.

An optical housing 11 is a casing of the optical scanner 10a and also serves to block the light coming from the outside. The optical housing 11 includes, as a component of the optical housing 11, a floor wall 19 between the light paths of the laser beam A and the laser beam B. In the optical housing 11, attachment portions of optical devices of the optical scanner 10a are formed integrally in the floor wall 19. The following describes how the optical devices are attached onto the optical housing 11.

Light source attachment portions 11a, 11a' are fitting holes slightly smaller than the outer circumference of stem portions of light sources 12, 22.

FIG. 3 is a cross-sectional schematic diagram showing the light source attachment portions 11a, 11a' of the optical scanner 10a according to the first embodiment. In FIG. 3, elements corresponding to those described above bear the same reference numerals. In FIG. 2, the X-axis indicates a main-scanning direction; the Y-axis indicates a sub-scanning direction; the Z-axis indicates an optical axis traveling direction); and the γ-axis indicates an optical axis circumferential direction.

Referring to FIG. 3, the light sources 12, 22 are press fitted into the light source attachment portions 11a, 11a' as fitting holes. Thus the mounting of the light sources 12, 22 in the optical housing 11 is completed.

Referring again to FIG. 2, a light source drive board 18 is an electronic circuit board configured to supply electric power to the upper and lower light sources 12, 22 individually and controls on and off of the upper and lower light sources 12, 22 individually. The light source drive board 18 is fixed to light source board attachment portions 11e, 11e' of the optical housing 11 by welding or threading. Then, the light source drive board 18 is electrically connected to the light sources 12, 22 by soldering.

Collimator lens attachment portions 11b, 11b' are formed in the floor wall 19 of the optical housing 11 between the light sources 12, 22 and apertures 14a, 14b on the light paths of the laser beams A, B. Collimator lens attachment portions 11b, 11b' have arcuate cross sections slightly greater than the circumferences of collimator lenses 13, 23 when viewed from the optical axis traveling direction of the laser beams A, B.

FIGS. 4A and 4B are cross-sectional schematic diagrams each showing the collimator lens attachment portions 11b, 11b' of the optical scanner 10a according to the first embodiment. In FIGS. 4A and 4B, elements corresponding to those described above bear the same reference numerals. In FIGS. 4A and 4B, the X-axis indicates the main-scanning direction; the Y-axis indicates the sub-scanning direction; the Z-axis indicates the optical axis traveling direction; and the γ-axis indicates the optical axis circumferential direction. FIGS. 4A and 4B are views in different directions.

Referring to FIGS. 4A and 4B, ultraviolet-curing adhesives 51, 52 are disposed between the collimator lenses 13, 23 and arcuate cross-sectional portions of the collimator lens attachment portions 11b, 11b' shown in FIG. 4A. After adjusting the positions of the collimator lenses 13, 23, the ultraviolet-curing adhesives 51, 52 are cured by ultraviolet irradiation, thereby bonding the collimator lenses 13, 23 to the collimator lens attachment portions 11b, 11b'. Thus the mounting of the collimator lenses 13, 23 in the optical housing 11 is completed. The ultraviolet-curing adhesives 51, 52 may be any of those well known in the art.

Referring again to FIG. 2, an aperture 14 is disposed on the floor wall 19 of the optical housing 11 between the collimator lenses 13, 23 and cylindrical lenses 15, 25 on the optical light paths of the laser beams A, B. The aperture 14 is a plate-shaped board including the aperture 14a for the laser beam A and the aperture 14b for the laser beam B integrally formed therein. An aperture attachment portion 11c is a fitting hole a having width slightly less than the width of the apertures 14, 34.

Figure 5B:
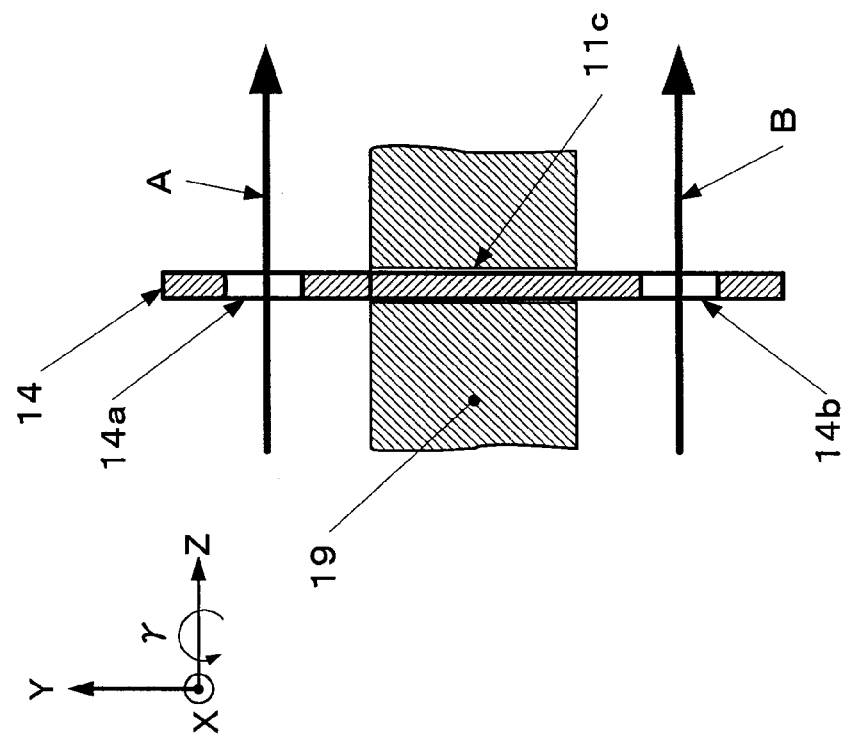
FIGS. 5A and 5B are cross-sectional schematic diagrams each showing an aperture attachment portion of the optical scanner according to the first embodiment.
Figure 5A:
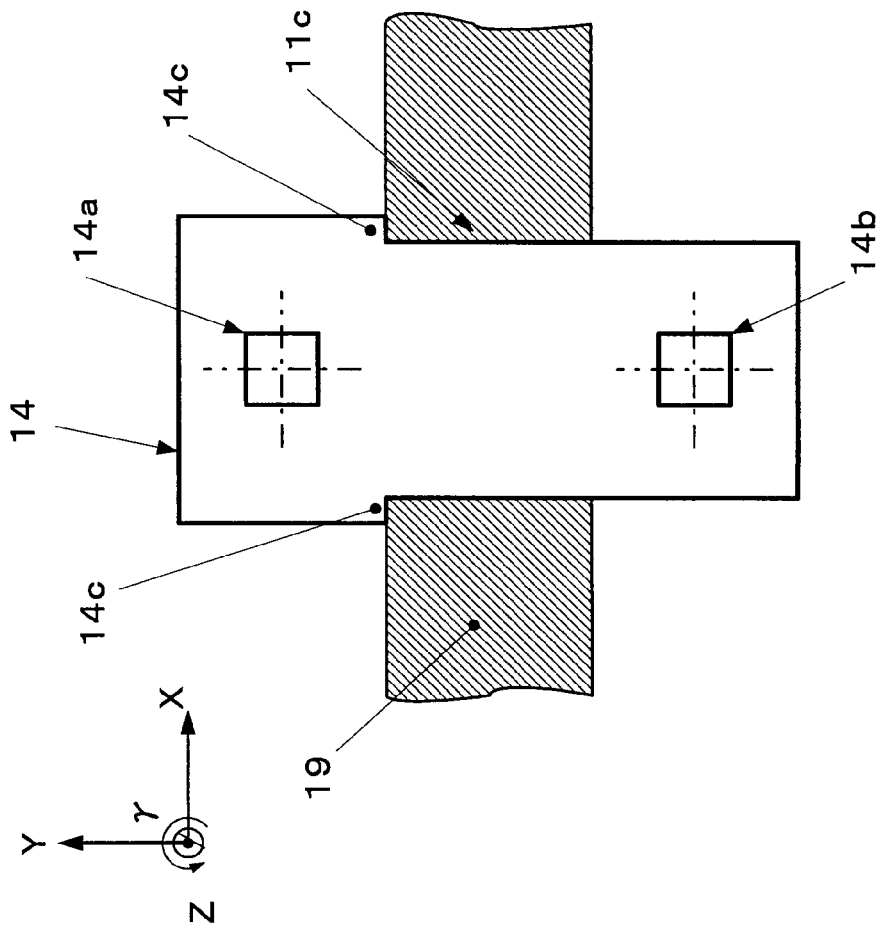

FIGS. 5A and 5B are cross-sectional schematic diagrams each showing the aperture attachment portion 11c of the optical scanner 10a according to the first embodiment. In FIGS. 5A and 5B, elements corresponding to those described above bear the same reference numerals. In FIGS. 5A and 5B, the X-axis indicates the main-scanning direction; the Y-axis indicates the sub-scanning direction; the Z-axis indicates the optical axis traveling direction; and the γ-axis indicates the optical axis circumferential direction. FIGS. 5A and 5B are views in different directions.

Referring to FIGS. 5A and 5B, the aperture 14 is press fitted into the aperture attachment portion 11c as a fitting hole. Thus the mounting of the aperture 14 in the optical housing 11 is completed.

Referring again to FIG. 2, cylindrical lens attachment portions 11d, 11d' are disposed on the floor wall 19 of the optical housing 11 between the apertures 14a, 14b and the deflector 16 on the light paths of the laser beams A, B. The cylindrical lens attachment portions 11d, 11d' are of the minimum size to allow positional adjustment of the cylindrical lenses 15, 25' in small gaps between the cylindrical lenses 15, 25 and the cylindrical lens attachment portions 11d, 11d'.

Figure 6B:
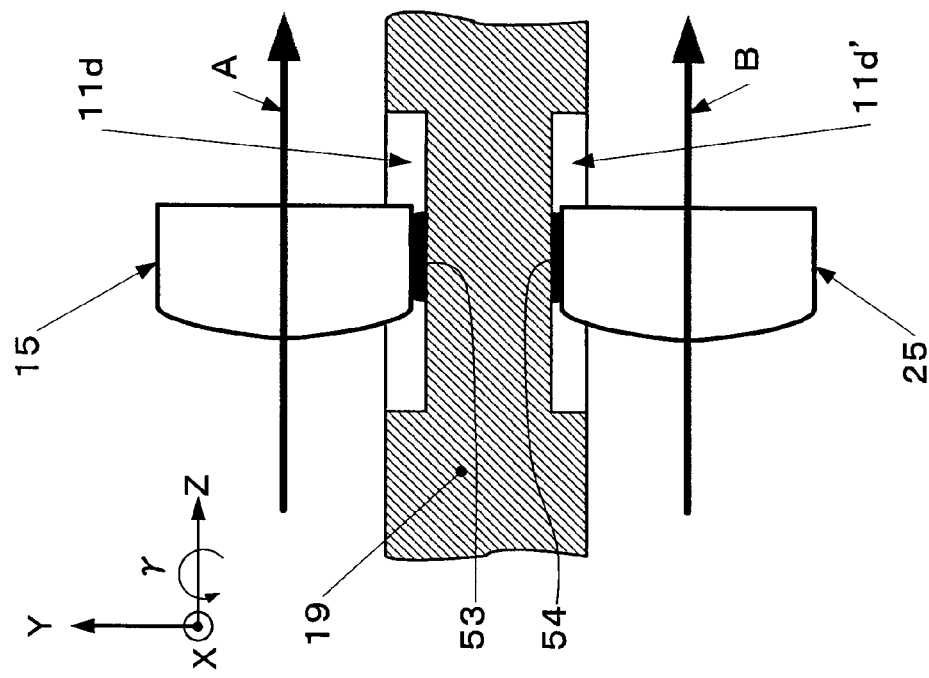
FIGS. 6A and 6B are cross-sectional schematic diagrams each showing cylindrical lens attachment portions of the optical scanner according to the first embodiment.
Figure 6A:
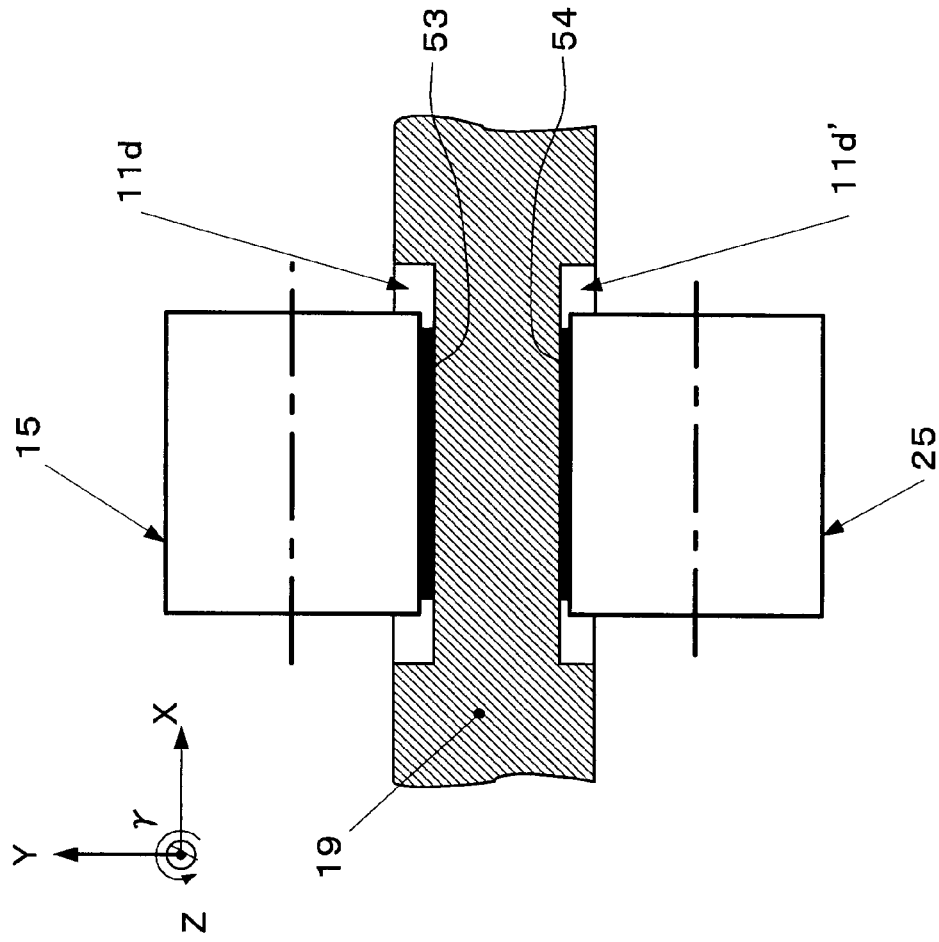

FIGS. 6A and 6B are cross-sectional schematic diagrams each showing the cylindrical lens attachment portions 11d, 11d' of the optical scanner 10a according to the first embodiment. In FIGS. 6A and 6B, elements corresponding to those described above bear the same reference numerals. In FIGS. 6A and 6B, the X-axis indicates the main-scanning direction; the Y-axis indicates the sub-scanning direction; the Z-axis indicates the optical axis traveling direction; and the γ-axis indicates the optical axis circumferential direction. FIGS. 6A and 6B are views in different directions.

Referring to FIG. 6, the cylindrical lenses 15, 25 are fixed by applying ultraviolet-curing adhesives 53, 54 between the cylindrical lens attachment portions 11d, 11d' and the cylindrical lenses 15, 25. After adjusting the positions of the cylindrical lenses 15, 25, the ultraviolet-curing adhesives 53, 54 are cured by ultraviolet irradiation, thereby bonding the cylindrical lenses 15, 25 to the cylindrical lens attachment portions 11d, 11d'. Thus the mounting of the cylindrical lenses 15, 25 in the optical housing 11 is completed. The ultraviolet-curing adhesives 53, 54 may be any of those well known in the art.

The above-described floor wall of the optical housing in which the attachment portions for the collimator lenses, the aperture, and the cylindrical lenses are formed is parallel to the main scanning direction and in the middle between the light paths of the upper and lower laser beams. The corresponding attachment portions in the optical housing are symmetric with respect to the center line between the upper and lower laser beams. This configuration applies to the pair of the pre-scanning optical systems of the laser beam C and the laser beam D as well as the pair of the pre-scanning optical systems of the laser beam A and the laser beam B.

Referring again to FIG. 2, the deflector 16 is positioned with reference to a positioning reference hole (not shown) in the floor wall 19 of the optical housing 11 and then fixed by being threaded into a threaded hole (not shown) in the optical housing 11.

A scanning lens 27 for the laser beam B shown in the lower side of FIG. 2 is positioned with reference to a reference hole (not shown) in the floor wall 19 in the optical housing 11. Then an ultraviolet-curing adhesive 56 is applied between the optical housing 11 and the scanning lens 27 and cured by ultraviolet irradiation, so that the scanning lens 27 is fixed to the floor wall 19. The ultraviolet-curing adhesive 56 may be any of those well known in the art.

A scanning lens 17 for the laser beam A shown in the upper side of FIG. 2 is positioned in the same manner as the scanning lens 27 for the laser beam B. An ultraviolet-curing adhesive 57 is applied between the scanning lens 27 for the laser beam B and the scanning lens 17 for the laser beam A and cured by ultraviolet irradiation, so that the scanning lens 17 is fixed to the scanning lens 27. The ultraviolet-curing adhesive 57 may be any of those well known in the art.

Figure 7:
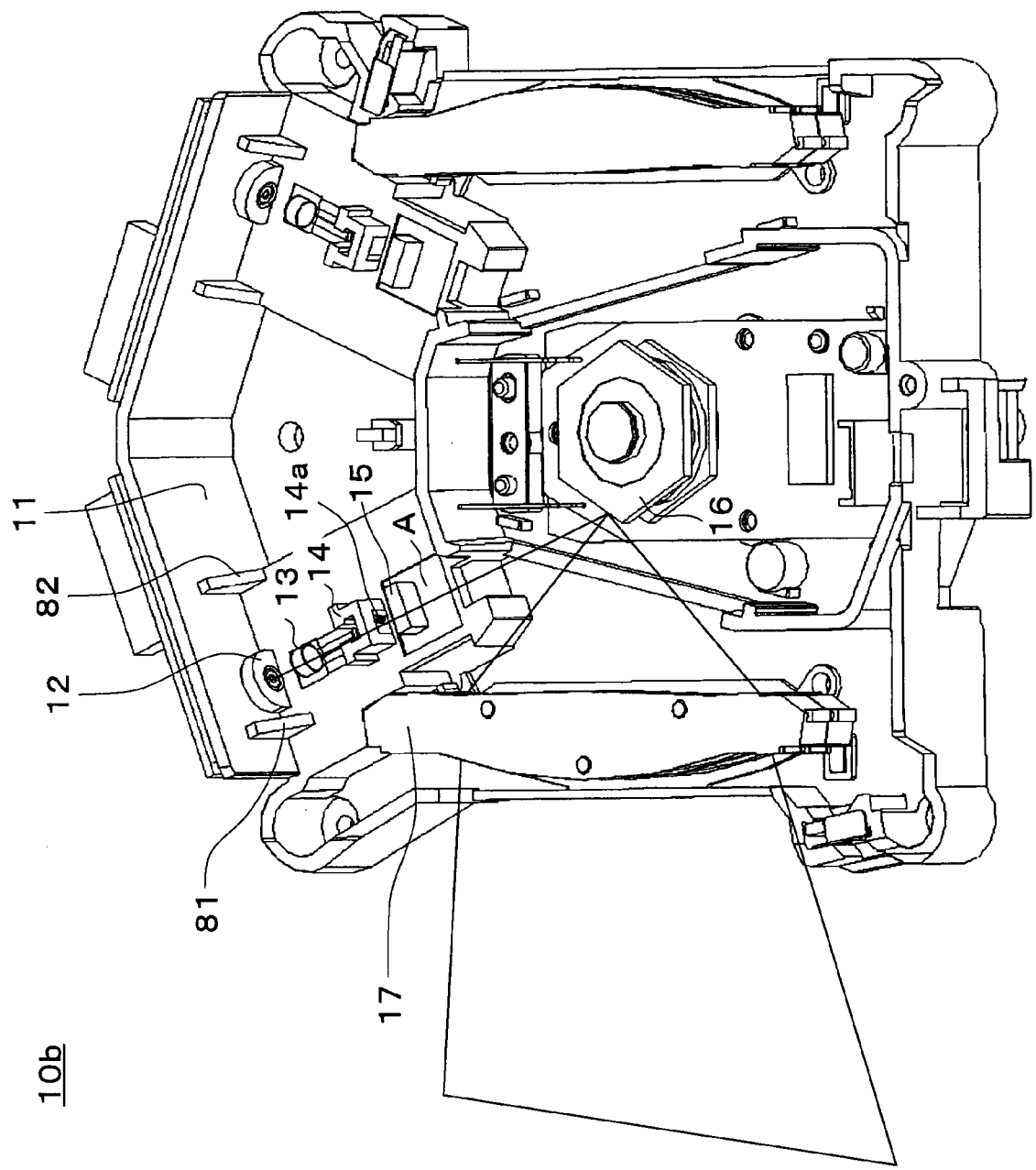
FIG. 7 is a perspective view for illustrating reinforcing ribs in an optical scanner according to the first embodiment.

FIG. 7 is a perspective view for illustrating reinforcing ribs 81, 82 in an optical scanner 10b according to the first embodiment. In FIG. 7, elements corresponding to those described above bear the same reference numerals and are not further described.

Referring to FIG. 7, the optical scanner 10b is the same as the optical scanner described above. In FIG. 7, only optical devices disposed on a laser beam A emitted from a light source 12 are denoted by reference numerals for purposes of simplicity of illustration.

A collimator lens 13, an aperture 14, and a cylindrical lens 15 are precisely positioned with reference to the position of a light source 12 disposed in an optical housing 11 and then fixed to the optical housing 11. The light source 12 is fixed to not the floor wall 19 but a side face of the optical housing 11, while the collimator lens 13, the aperture 14, and the cylindrical lens 15 are fixed to the floor wall 19 of the optical housing 11. Therefore, if a mechanical impact or mechanical vibration is applied to the optical scanner 10b, the positional relationship precisely determined with reference to the position of the light source 12 is changed, so that intended optical scanning is not likely to be performed.

To minimize the change in the positional relationship of the collimator lens 13, the aperture 14, and the cylindrical lens 15 with respect to the light source 12, the reinforcing ribs 81, 82 are connected to the side face of the optical housing 11 to which the light source 12 is attached and the floor wall 19 to which the collimator lens 13, the aperture 14, and the cylindrical lens 15 are attached.

The reinforcing rib 81 and the reinforcing rib 82 may be quadrangular-prism shaped, triangular prism-shaped, or L-shaped, for example. One side of each of the reinforcing ribs 81, 82 is fixed by bonding or the like to the side face of the optical housing 11 to which the light source 12 is attached. Another side of each of the reinforcing ribs 81, 82 is fixed by bonding or the like to the floor wall 19 of the optical housing 11 to which the collimator lens 13, the aperture 14, and the cylindrical lens 15 are attached.

The provision of the reinforcing ribs 81, 82 makes the positional relationship of the collimator lens 13, the aperture 14, and the cylindrical lens 15 with respect to the light source 12 more stable.

Figure 8:
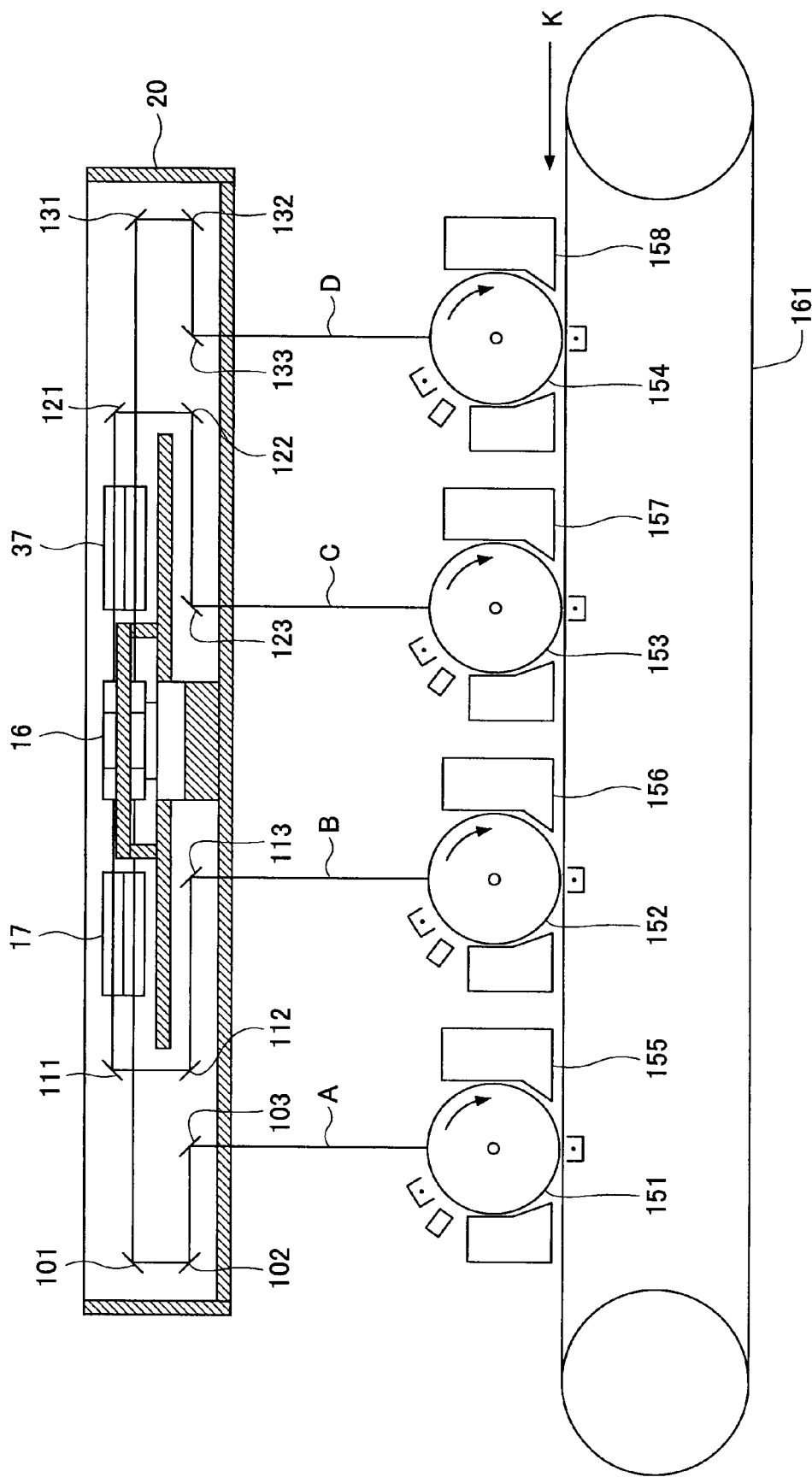
FIG. 8 is a configuration diagram showing an image forming apparatus in which an optical scanner is mounted according to the first embodiment.

FIG. 8 is a configuration diagram showing an image forming apparatus 100 in which an optical scanner is mounted according to the first embodiment. In FIG. 8, elements corresponding to those described above bear the same reference numerals and are not further described.

Referring to FIG. 8, the image forming apparatus 100 in which the optical scanner is mounted according to the first embodiment is adapted to print predetermined electronic color images onto recording paper in colors. The image forming apparatus 100 generally includes the optical scanner, a first photoreceptor 151, a second photoreceptor 152, a third photoreceptor 153, a fourth photoreceptor 154, and a recording paper transport belt 161.

Similar to the optical scanner described above, the optical scanner emits a laser beam A, a laser beam B, a laser beam C, and a laser beam D from the four light sources (not shown). The laser beams of four light paths pass through corresponding collimator lenses, apertures, and cylindrical lenses and are reflected by a single deflector 16.

The laser beam A and the laser beam B reflected by the deflector 16 pass through a scanning lens 17. The laser beam A is deflected by a first A mirror 101, a second A mirror 102, and a third A mirror 103 and scans the surface of the first photoreceptor 151 as a scanning surface. The laser beam B is deflected by a first B mirror 111, a second B mirror 112, and a third B mirror 113 and scans the surface of the second photoreceptor 152 as a scanning surface.

The laser beam C and the laser beam D reflected by the deflector 16 pass through a scanning lens 37. The laser beam C is deflected by a first C mirror 121, a second C mirror 122, and a third C mirror 123 and scans the surface of the third photoreceptor 153 as a scanning surface. The laser beam D is deflected by a first D mirror 131, a second D mirror 132, and a third D mirror 133 and scans the surface of the fourth photoreceptor 154 as a scanning surface.

The first photoreceptor 151 is, as mentioned above, scanned across the surface by the laser beam A. The scanning by the laser beam A produces a latent image on the surface of the first photoreceptor 151. The latent image on the surface of the first photoreceptor 151 is developed with toner by a first development unit 155 to form a visible toner image. For example, in the case where the developing toner of the first development unit 155 is black, image information of a portion of a color electronic image to be printed in black is recorded as a latent image on the surface of the first photoreceptor 151.

The second photoreceptor 152 is, as mentioned above, scanned across the surface by the laser beam B. The scanning by the laser beam B produces a latent image on the surface of the second photoreceptor 152. The latent image on the surface of the second photoreceptor 152 is developed with toner by a second development unit 156 to form a visible toner image. For example, in the case where the developing toner of the second development unit 156 is cyan, image information of a portion of a color electronic image to be printed in cyan is recorded as a latent image on the surface of the second photoreceptor 152.

The third photoreceptor 153 is, as mentioned above, scanned across the surface by the laser beam C. The scanning by the laser beam C produces a latent image on the surface of the third photoreceptor 153. The latent image on the surface of the third photoreceptor 153 is developed with toner by a third development unit 157 to form a visible toner image. For example, in the case where the developing toner of the third development unit 157 is magenta, image information of a portion of a color electronic image to be printed in magenta is recorded as a latent image on the surface of the third photoreceptor 153.

The fourth photoreceptor 154 is, as mentioned above, scanned across the surface by the laser beam D. The scanning by the laser beam D produces a latent image on the surface of the fourth photoreceptor 154. The latent image on the surface of the fourth photoreceptor 154 is developed with toner by a fourth development unit 158 to form a visible toner image. For example, in the case where the developing toner of the fourth development unit 158 is yellow, image information of a portion of a color electronic image to be printed in yellow is recorded as a latent image on the surface of the fourth photoreceptor 154.

The recording paper transport belt 161 is configured to rotate in the direction indicated by the arrow K of FIG. 8, and is in contact with the first photoreceptor 151, the second photoreceptor 152, the third photoreceptor 153, and the fourth photoreceptor 154. A sheet of recording paper is placed on the recording paper transport belt 161 at the position of the arrow K of FIG. 8. The recording paper comes into contact with the fourth photoreceptor 154, the third photoreceptor 153, the second photoreceptor 152, and the first photoreceptor 151 in this order by the rotation of the recording paper transport belt 161. When in contact with each one of the photoreceptors, the toner image on the photoreceptor is transferred onto the recording paper. In this way, a yellow portion of the color electronic image to be printed onto the recording paper is printed with a yellow toner by the fourth photoreceptor 154; a magenta portion is printed with a magenta toner by the third photoreceptor 153; a cyan portion is printed with a cyan toner by the second photoreceptor 152; and a black portion is printed with a black toner by the first photoreceptor 151. With these four steps of printing with toners, a predetermined color electronic image is recorded onto the recording paper.

In the first embodiment, in place of the ultraviolet-curing adhesive, adhesives curable by irradiation of lights having different wavelengths from ultraviolet light or a thermosetting adhesive may be used for fixing the optical devices.

In the first embodiment, since the incident angles of the laser beams from the pre-scanning optical systems onto the deflector with respect to the rotational direction of the deflector is in only one direction, the required effective range of the reflecting surface of the deflector can be reduced. This allows use of a deflector with lower reflecting surface accuracy and a deflector with lower rotational accuracy and therefore can reduce the production costs. Similarly, the required effective range of the scanning lens can be reduced. This allows use of a smaller scanning lens and therefore can downsize the optical scanner and reduce the production costs.

The corresponding optical devices of the pairs of the pre-scanning optical systems are disposed in the same positions and oriented at the same angles in the main-scanning direction. Accordingly, the shape of the optical housing can be simplified compared with the shape of an optical housing in which laser beams are incident on a deflector at angles different from one another. It is therefore possible to reduce the production costs of the optical housing and improve manufacturing accuracy.

In the optical housing, the floor wall is in the sub-scanning direction of the light paths of the laser beams of the pair of the pre-scanning optical systems, and the optical devices are directly attached to the upper and lower sides of the floor wall in the sub-scanning direction. This configuration provides the following advantages. It is possible to directly adjust the positions of the collimator lenses and the cylindrical lenses to achieve optical properties required on the scanning surface. This eliminates buildup of optical property errors due to providing a light source unit including the laser light sources and the collimator lenses as a separate unit. It is also possible to reduce the error in mounting the deflector and the shape accuracy error of the scanning lenses. It is therefore possible to improve the accuracy of the optical scanner and reduce the component costs. As described above, since the pre-scanning optical system including the laser light source and the collimator lens is not provided as a separate unit, there is no need to have a member serving as a base of the pre-scanning optical system. Therefore, device costs and production costs for adjustment and assembly of the light source unit are eliminated, thereby reducing the overall cost of the optical scanner. Since the optical devices are directly attached to the upper and lower sides of the floor wall of the optical housing, it is easy to have the space for mounting the optical devices in the optical scanner and the space for ultraviolet irradiation to the adhesive. It is therefore possible to position and mount the upper and lower optical devices at the same time, resulting in reducing production time and the manufacturing costs.

As another advantage of the first embodiment, since the reinforcing ribs are connected to the side face of the optical housing 11 to which the light source 12 is attached and the floor wall to which the collimator lens and the cylindrical lens are attached, the relative positions of the light source with respect to other optical devices is not easily changed due to vibration or impact, so that it is possible to provide an optical scanner that is stable against the external environment.

Second Embodiment

A second embodiment is a modified example of the first embodiment.

FIG. 9 is a cross-sectional schematic diagram showing an optical scanner 10d according to the second embodiment. In FIG. 9, elements corresponding to those described above bear the same reference numerals and are not further described.

Referring to FIG. 9, the cross-sectional schematic diagram of the optical scanner 10d shows light paths of a pair of pre-scanning optical systems of a laser beam A and a laser beam B. A pair of pre-scanning optical systems of a laser beam C and a laser beam D has the same configuration as the pair of the pre-scanning optical systems of the laser beam A and the laser beam B and therefore is not described herein. The cross-sectional schematic diagram of the optical scanner 10d of FIG. 9 continuously shows two cross sections in different directions at the opposing sides of a dotted-line of FIG. 9 passing through the reflecting surface of the deflector 16 described with reference to FIG. 1. In FIG. 9, the X-axis indicates a main-scanning direction; the Y-axis indicates a sub-scanning direction; the Z-axis indicates an optical axis traveling direction); and the γ-axis indicates an optical axis circumferential direction.

The optical scanner 10d of the second embodiment has a configuration similar to the configuration of the optical scanner of the first embodiment. The difference is that, while the aperture of the first embodiment is formed separately from the floor wall of the optical housing, an aperture 14 of the second embodiment is formed integrally with a floor wall 19 of an optical housing 11.

Figure 10B:
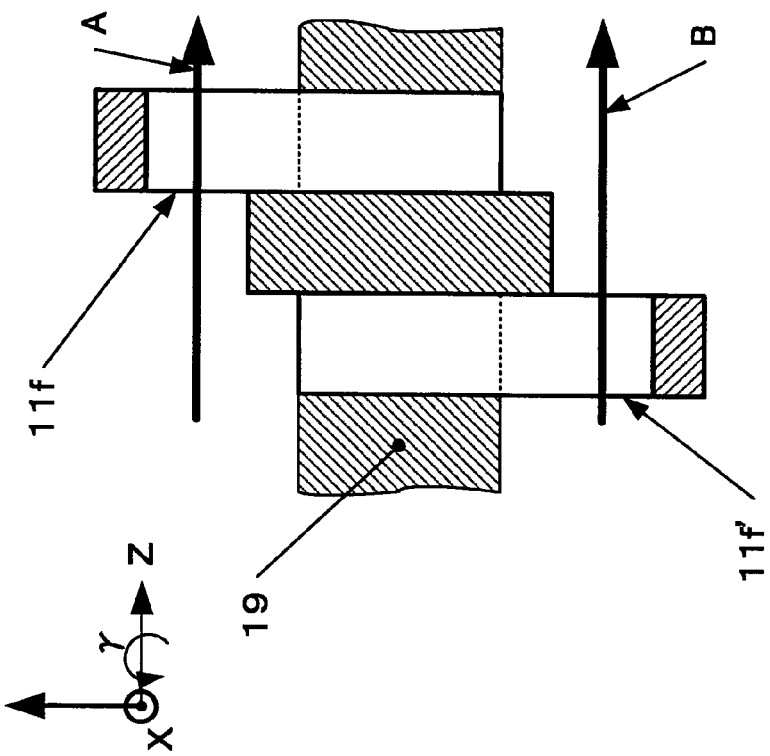
FIGS. 10A and 10B are cross-sectional schematic diagrams each showing an aperture molded integrally with an optical housing of the optical scanner according to the second embodiment.
Figure 10A:
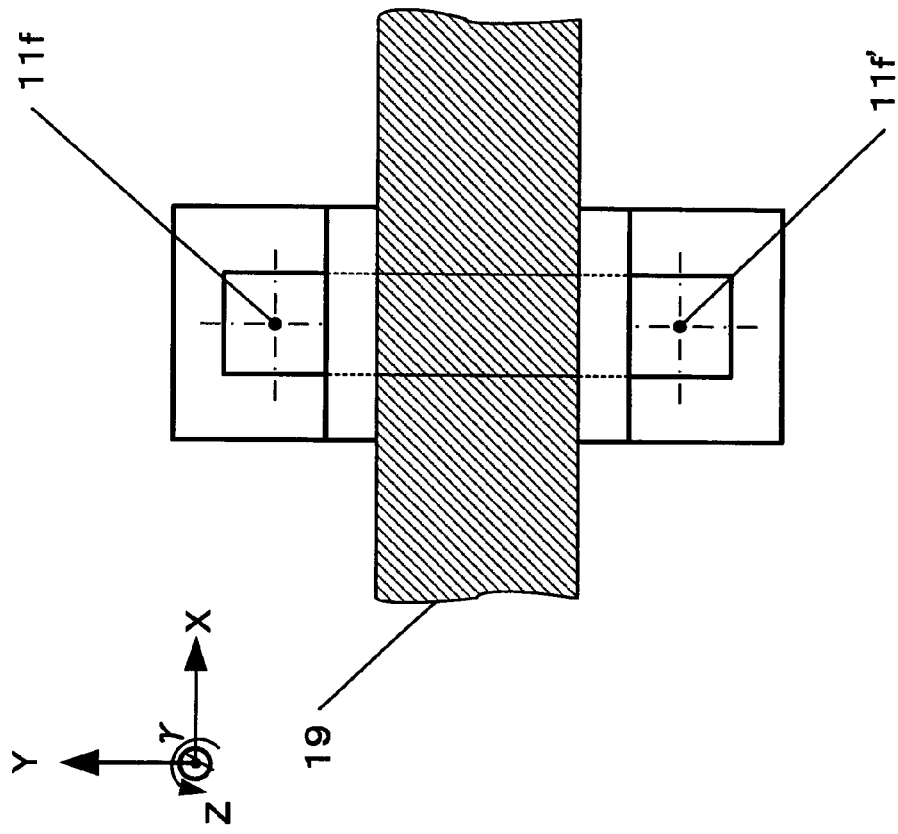

FIGS. 10A and 10B are cross-sectional schematic diagrams each showing the aperture molded integrally with the optical housing of the optical scanner according to the second embodiment. In FIGS. 10A and 10B, elements corresponding to those described above bear the same reference numerals. In FIGS. 10A and 10B, the X-axis indicates the main-scanning direction; the Y-axis indicates the sub-scanning direction; the Z-axis indicates the optical axis traveling direction; and the γ-axis indicates the optical axis circumferential direction. FIGS. 10A and 10B are views in different directions.

Referring to FIGS. 10A and 10B, the aperture 14 is molded integrally with the floor wall 19. An aperture 11f through which the laser beam A passes and an aperture 11f' through which the laser beam B passes are in different positions in the Z axis direction.

Except for the configuration of the aperture 14, the second embodiment is the same as the first embodiment.

In the second embodiment, since the aperture can be integrally molded with the optical housing, there is no need to have an aperture in the form of a separate unit to be assembled in the optical housing, thereby eliminating the process of positioning and fixing the aperture.

Also, since the upper and the lower apertures in the sub-scanning direction are disposed in different positions in the main-scanning direction, there is no need to use nested molds for molding the optical housing, so that it is possible to mold the optical housing with high accuracy at low cost.

Third Embodiment

A third embodiment is a modified example of the first embodiment.

FIG. 11 is a cross-sectional schematic diagram showing an optical scanner 10e of a third embodiment. In FIG. 11, elements corresponding to those described above bear the same reference numerals and are not further described.

Referring to FIG. 11, the cross-sectional schematic diagram of the optical scanner 10e shows light paths of a pair of pre-scanning optical systems of a laser beam A and a laser beam B. A pair of pre-scanning optical systems of a laser beam C and a laser beam D has the same configuration as the pair of the pre-scanning optical systems of the laser beam A and the laser beam B and therefore is not described herein. The cross-sectional schematic diagram of the optical scanner 10e of FIG. 11 continuously shows two cross sections in different directions at the opposing sides of a dotted-line of FIG. 11 passing through the reflecting surface of the deflector 16 described with reference to FIG. 1. In FIG. 11, the X-axis indicates a main-scanning direction; the Y-axis indicates a sub-scanning direction; the Z-axis indicates an optical axis traveling direction; and the γ-axis indicates an optical axis circumferential direction.

The optical scanner 10e of the third embodiment has a configuration similar to the configuration of the optical scanner of the first embodiment. In the first embodiment, two scanning lenses for the laser beam A and the laser beam B are stacked and bonded to one on another. In the second embodiment, a scanning lens 17 for the laser beam A and a scanning lens 27 for the laser beam B are bonded onto a floor wall 19 of an optical housing 11 disposed between the two scanning lenses.

The third embodiment is the same as the first embodiment except for the configuration of the scanning lenses.

In the third embodiment, since the two scanning lenses are not stacked and bonded one on another but are directly bonded to the floor wall of the optical housing, the positions of the scanning lenses are not easily changed due to vibration and impact. It is therefore possible to provide an optical scanner that is stable against the external environment.

The present application is based on Japanese Priority Application No. 2006-284314 filed on Oct. 18, 2006, with the Japanese Patent Office, the entire contents of which are hereby incorporated by reference.

The invention claimed is:

1. An optical scanner that performs scanning by deflecting plural light beams using a single deflector, comprising:
    plural pre-scanning optical systems configured to emit the plural light beams, each pre-scanning optical system including a light source, wherein
    a first of the pre-scanning optical systems is configured to emit a first of the light beams to be deflected by the deflector,
    a second of the pre-scanning optical systems is configured to emit a second of the light beams and is disposed in a position different from a position of the first pre-scanning optical system in a rotational axis direction of the deflector, and
    the first and second pre-scanning optical systems are further configured to emit the first and second light beams parallel to each other.

2. The optical scanner as claimed in claim 1, wherein the first and second pre-scanning optical systems are plane symmetric.

3. The optical scanner as claimed in claim 2, further comprising:
    a floor wall between light paths of the first and second light beams;
    wherein the first and second pre-scanning optical systems excluding the light sources are disposed on the floor wall.

4. The optical scanner as claimed in claim 3, wherein the floor wall is connected and fixed to an optical housing which optical housing serves as a casing.

5. The optical scanner as claimed in claim 4, wherein the light source is press fitted in a fitting hole or a fitting groove as a light source attachment portion in the optical housing.

6. The optical scanner as claimed in claim 4, wherein each of the pre-scanning optical systems includes a collimator lens that is bonded by a light-curing adhesive to a collimator lens attachment portion in the floor wall after adjusting a position of the collimator lens in the collimator lens attachment portion.

7. The optical scanner as claimed in claim 4, wherein each of the pre-scanning optical systems includes a cylindrical lens that is bonded by a light-curing adhesive to a cylindrical lens attachment portion in the floor wall after adjusting a position of the cylindrical lens in the cylindrical lens attachment portion.

8. The optical scanner as claimed in claim 4, wherein
each of the pre-scanning optical systems includes an aperture; and
the aperture of the first pre-scanning optical system and the aperture of the second pre-scanning optical system have a unitary structure.

9. The optical scanner as claimed in claim 8, wherein the aperture is press fitted into an aperture attachment portion as a fitting groove in the floor wall.

10. The optical scanner as claimed in claim 4, wherein each of the pre-scanning optical systems includes an aperture integrally molded with the floor wall.

11. The optical scanner as claimed in claim 4, wherein the floor wall is fixed onto the optical housing by a reinforcing rib to maintain a relative position of the light sources with respect to the collimator lenses, the cylindrical lenses, and the apertures.

12. The optical scanner as claimed in claim 1, wherein the light source includes a multibeam light source that emits plural parallel laser beams.

13. An image forming apparatus comprising:
the optical scanner of claim 1.

* * * * *